Inventors
Akio Ohkoshi
Takehiko Nii
Yoshihiro Tsukamura

Inventors
Akio Ohkoshi
Takehiko Nii
Yoshihiro Tsukamura

United States Patent Office 3,437,868
Patented Apr. 8, 1969

3,437,868
ELECTRON GUN DEVICE
Akio Ohkoshi, Takehiko Nii, and Yoshihiro Tsukamura, Tokyo, Japan, assignors to Sony Corporation, Tokyo, Japan, a corporation of Japan
Filed Oct. 11, 1965, Ser. No. 494,566
Int. Cl. H01j 29/48
U.S. Cl. 315—15                            6 Claims

ABSTRACT OF THE DISCLOSURE

A colored television kinescope electron gun for producing a stream of electrons along a path coincident with the central axis of the gun including a cathode and a series of apertured electrodes downstream from the cathode whereby the electron beam emitted from the gun may be proportional to either the sum or the product of the signal impressed upon selected electrodes of the gun.

This invention relates to an electron gun device for use in a cathode ray tube. More particularly it relates to an electron gun device for use in a color television receiver kinescope, and in one aspect the invention relates to the combination of an electron gun device with particular types of color television-receiving systems.

Although the present invention may find utility in other environments, for definiteness it will be described in its presently contemplated best mode of operation, that is, in conjunction with color television receiver kinescope color picture reproduction. Also, as the present official color television standard for the United States is the "NTSC" system, the invention will be described in conjunction with a receiver for processing this type of color broadcast. It should be noted, however, that the invention is of more general applicability.

The present system of color television broadcast in use in the United States and Canada is the so-called "NTSC" system. In this system, combined color information representing the three color attributes of brightness, hue and saturation of a scene are combined in a composite color signal. The composite color signal comprises a luminance signal Y whose amplitude varies in accordance with the brightness values of a televised scene and a chrominance signal C which represents the hues and saturation of the scene. The chrominance signal C is a 3.58 mc. carrier (often called a "sub-carrier" signal) which is quadrature modulated with the hue and saturation information. By proper demodulation and/or matrixing methods, well known in the art, color difference signals such as the red color difference signal (R-Y), the blue color difference signay (B-Y) and the green color difference signal (G-Y) may be derived from the chrominance signal C. These signals may then be combined with the luminance signal Y to define picture information in terms of the three primary colors—red, blue and green.

While the three-gun color kinescope is presently the most common, several different types of single electron gun color television receiver kinescopes have been proposed. One such general type of kinescope is the Lawrence tube. This type of tube presents a color display by using a phosphor screen made up of strips of red, green and blue phosphors with a post-deflection wire grid positioned adjacent the screen for deflecting the electron beam sequentially to one particular type of the phosphor strips. The present, most popular particular type of Lawrence tube is the Chromatron. The deflection wire grid of the Chromatron is normally spaced approximately a centimeter behind the phosphor screen and the wires are connected together in two sets. The wires in one set are in line with the green phosphor strips while those wires of the other set are in line with the blue phosphor strips. There are no wires in line with the red strips, of which there are twice as many as there are green or blue strips. In operation, if there is no voltage between the two sets of wire grids, the electron beam passes through the wires and is focused on the red color phosphor strips. By placing an appropriate voltage difference between the two sets of grid wires, the electron beam is bent toward the nearest positive wire and aligned on the corresponding green or blue phosphor strip depending upon the polarity of the applied voltage. In this way, the grid wires control the primary color which is reproduced in any instance and the video signal must be switched so that corresponding red, green or blue signals are applied to the electron gun.

Another type of Chromatron employs phosphor strips which do not contain a predominance of any particular phosphor. This tube employs a red, blue and green phosphor strip grouping which is repeated continuously across the screen and has an equal number of each type of phosphor strip. In this case, a different type of switching signal may be applied to the grid wires which can result in the focusing of the electron beam on different ones of the phosphor strips in sequence.

Another type of single gun color kinescope is the sensing tube. A specific laboratory model of this type of tube is the so-called "Apple" tube. This tube also uses a phosphor screen comprising red, green and blue strips. Instead of directing the electron beam on the required color phosphor, however, the beam (as it traces out its normal raster) scans over each vertical strip in turn. In order that the video circuits may select the right primary color signal to apply to the single electron gun, it is necessary for the display tube to be able to tell the video circuits which color phosphor the electron beam is striking at any particular instance. Various ways of producing this sensing information have been proposed. In the "Apple" tube, the phosphor screen of vertical red, green and blue strips has dark luminescent areas between each phosphor strip, each dark area being as wide as a phosphor strip. This insures that the scanning spots can illuminate any primary color without desaturation. The efficiencies of the phosphor are adjusted by the inclusion of non-activated materials so that the unmodulated scanning beam produces a white raster. Behind the normal aluminum screen backing, another layer of vertical strips of high secondary emission material, normally magnesium oxide, is deposited. One strip of such material to each triad of phosphor strips is required. In operation as the scanning beam passes over a secondary emission strip or index strip as it is scalled, it emits a burst of secondary electrons which are collected by the ultor, normally, a conductive coating on the inside of the tube bulb. The burst of secondary emissions can be used to synchronize the gating of the red color signal, and hence of the blue and green signals. The "Apple" tube thus finds it is able to index or sense the position of the electron beam relative to the various phosphors and this information detected off of the aqueous carbon coating on the inside of the kinescope bulb is used in controlling the demodulated signal fed to the electron gun.

Several different composite color signal processing systems may be employed by a television receiver. As mentioned above, it is conventional in three electron gun kinescope receivers to derive and separate the chrominance and luminance signals. The chrominance signal is then demodulated and color difference signal derived. The luminance signal is conventionally applied to the cathodes of each electron gun, while a separate color difference signal is applied to control grids of each of the electron guns.

In single electron gun kinescope receivers it is possible to eliminate a separate color difference demodulator circuit and perform this function within the color kinescope itself. This general system of signal processing may be termed the self-decoding system. In a self-decoding system the luminance signal Y, the chrominance signal and a gating signal are coupled to the electron gun. Co-acting between these signals and the post-deflection grid, switching signals produce the desired color scene.

A new system of signal processing that has been proposed may be termed the re-encoding system. In this system, the color difference signals are demodulated and then remodulated on a high frequency signal. In this system, the re-modulated color difference signals, the luminance signal and a color signal are coupled to the electron gun. Various modifications of these basic types of systems have been proposed. In the self-decoding system an electron beam must be obtained in accordance with the sum or product of the signal components, while in the new re-encoding system an electron beam must be obtained in accordance with the sum of the signal components. In order to fulfill such requirements, the electron gun must be provided with at least three grids of high transconductance.

It is the primary object of the present invention to provide a new and improved electron gun device.

It is one object of this invention to provide an electron gun comprising a hexode structure and three grids of high transconductance in which an electron beam is controlled by a reflex control method, the electron beam being obtained in the form of either the sum of product of input signals.

It is another object of this invention to provide an electron gun device having an improved electron gun for picture display with low drive signals.

It is a further object of this invention to provide such an electron gun device which is of special utility when used in a single electron gun type kinescope of a color television receiver employing one of the above mentioned systems.

The organization and manner of operation of the invention, together with further objects and advantages thereof may best be understood by reference to the following description taken in connection with the accompanying drawings, in the several figures of which like reference numerals identify like elements, and in which an exemplification of the invention is illustrated.

Figure 1:
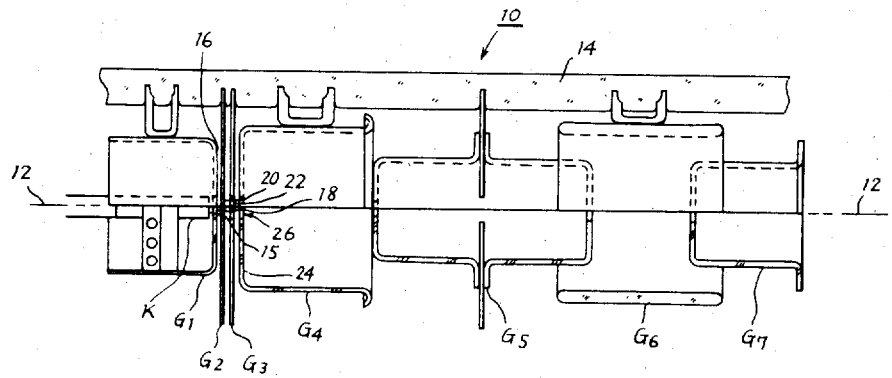
FIG. 1 is a longitudinal view, partly in section, illustrating an electron gun constructed according to the principles of this invention.

Referring to FIG. 1, there is depicted an electron gun generally indicated by the numeral 10. Electron gun 10 serves to produce a stream of electrons along a path 12 which is coincident with the central axis of the gun 10. The electrons proceed from a cathode labeled K along axis 12 to and beyond a last grid labeled $G_7$. Between the cathode K and the last grid $G_7$ are positioned six grids $G_1$, $G_2$, $G_3$, $G_4$, $G_5$ and $G_6$. These grids as well as grid $G_7$ and cathode K are supported, in a conventional manner by a ceramic gun support 14 which lies parallel to, but spaced from, path or axis 12.

Grids $G_5$, $G_6$ and $G_7$ constitute the conventional electron beam focusing grids and, as such, will not be described in detail. Grids $G_1$–$G_4$ are constructed in accordance with the present invention.

Cathode K is of a generally cylindrical shape and is aligned with its central axis coincident with axis 12. One closed end 15 of cathode K serves as the primary source of electrons for the gun 10. Grid $G_1$ is also of a generally cylindrical shape with its central axis lying along axis 12. Grid $G_1$ has a greater cylindrical diameter and lies about the cathode K with one disc-shaped end 16 nearly masking cathode end 15 except for an axis 12 centered aperture 18. The apertured disc-shaped portion 16 of grid $G_1$ constitutes the effective electron stream-controlling portion of grid $G_1$. Grids $G_2$ and $G_3$ constitute, respectively, progressively downstream apertured disc-shaped members. These grids have apertures 20 and 22, respectively, which are centered about axis 12.

Grid $G_4$ comprises a generally hollow cylindrical member having one nearly closed disc-shaped end 24. Grid $G_4$ is centered about axis 12 further downstream from grids $G_2$ and $G_3$, extends to approximately grid $G_5$, and has its nearly closed end 24 parallel and adjacent to, but spaced from, grid $G_3$. It also has an axis 12 centered aperture 26. Disc-shaped portion 24 with its aperture 26 serves as the primary electron stream controlling mechanism of grid $G_4$.

For convenience and ease of reference, the conventional designations adopted in this patent for the voltages, currents, aperture diameter, perveance and transconductance are summarized below:

K: cathode
$G_1$ to $G_7$: first to seventh electrodes, inclusive
$V_k$: direct current cathode potential with respect to a common reference potential commonly termed the earth potential
$V_1$ to $V_7$: direct current potentials of the first to seventh electrodes, inclusive, with respect to the reference potential, the earth potential
$V_{k0}$, $V_{10}$ ... $V_{40}$: cut-off bias of the cathode K, the electrodes $G_1$ to $G_4$, inclusive
$v_K$: signal voltage applied to the cathode K
$v_1$, $v_2$, $v_3$ and $v_4$: signal voltages applied to the electrodes $G_1$ to $G_4$, inclusive
$I_p$: electron beam current
D: aperture diameter of the electrodes $G_1$ to $G_4$ apertures 18, 20, 22 and 26, inclusive
k: perveance of the electron gun $g_m$: transconductance of the electrodes
$\mu$: amplification constant
$d_{K1}$: distance between cathode K surface 15 and grid $G_1$
$d_{12}$: the distance between grid $G_1$ and grid $G_2$
$d_{23}$: the distance between grid $G_2$ and grid $G_3$
$d_{34}$: the distance between grid $G_3$ and grid $G_4$
$t_1$: the thickness of grid $G_1$ disc-shaped member 16
$t_2$: the thickness of grid $G_2$
$t_3$: the thickness of grid $G_3$
$t_4$: the thickness of grid $G_4$ disc-shaped member 24

(Unless otherwise stated, all distances are in millimeters, voltages in volts and currents in milliamperes.)

The amplification constant $\mu$ of the electron gun 10 is given by $$\mu = \frac{V_2 - V_k}{V_k - V_{30}}$$

The electron gun 10 includes the cathode K and electrodes $G_1$ to $G_5$, constituting a hexode structure. The electrode $G_5$ is an anode of the electron gun of the hexode structure. In FIG. 1 a uni-potential electrostatic focusing lens assembly consisting of electrodes $G_5$, $G_6$ and $G_7$ has been added to the hexode. An aperture made in the center of the electrode $G_5$ is not related to the essential part of this invention and the present invention primarily resides in a control system, not in a focusing system, so that no explanation will be given about the electrodes $G_6$ and $G_7$.

The control characteristics of the electron gun of the present invention depend upon the structure of the cathode K and the electrodes $G_1$ to $G_4$, inclusive. That is, the characteristics are determined by the dimension shown by reference numerals in FIG. 2 and the shape of the electrodes.

Figure 2:
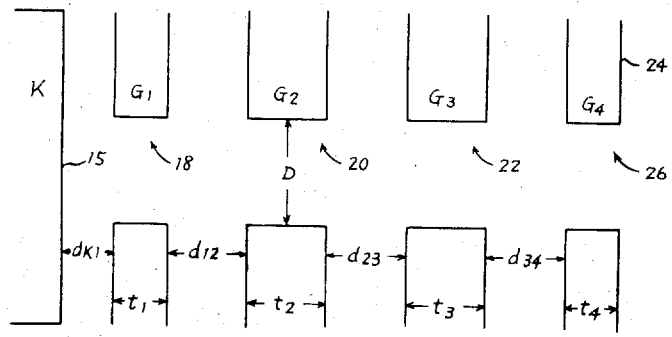
FIG. 2 is a diagram schematically illustrating the dimensions of part of the structure of the electron gun as shown in FIG. 1.

In using the above described electron gun in a color television kinescope used in conjunction with a self-adjusting system, the following table shows seven examples (1–7) of the relationships among the distance between the electrodes, the dimension of the aperture diameter thereof shown in FIG. 2 (millimeter) and the amplification constant $\mu$.

TABLE

| No. | $d_{K1}$ | $t_1$ | $d_{12}$ | $t_2$ | $d_{23}$ | $t_3$ | $d_{34}$ | $t_4$ | D | $\mu$ |
|---|---|---|---|---|---|---|---|---|---|---|
| I | 0.1 | 0.18 | 0.2 | 0.4 | 0.5 | 0.4 | 0.2 | 0.18 | 0.6 | 6.7 |
| II | 0.12 | 0.15 | 0.2 | 0.4 | 0.4 | 0.4 | 0.4 | 0.25 | 0.7 | 5.7 |
| III | | 0.15 | 0.2 | 0.4 | 0.8 | 0.1 | 0.8 | 0.25 | 0.7 | 3.3 |
| IV | 0.2 | 0.15 | 0.3 | 0.4 | 0.4 | 0.4 | 0.4 | 0.25 | 1.0 | 2.7 |
| V | 0.12 | 0.15 | 0.2 | 0.4 | 0.4 | 0.2 | 0.4 | 0.25 | 0.7 | 3.1 |
| VI | 0.2 | 0.15 | 0.3 | 0.4 | 0.4 | 0.2 | 0.4 | 0.25 | 1.0 | 1.5 |
| VII | 0.2 | 0.15 | 0.2 | 0.4 | 0.2 | 0.4 | 0.15 | 0.25 | 1.0 | 1.5 |

The focusing system of No. II is a bi-potential electrostatic focusing system and the others are uni-potential ones. The amplification constant $\mu$ depends upon the shape and dimension of the electrodes $G_2$, $G_3$ and $G_4$ and the distance therebetween and the aperture diameter D thereof.

Figure 3:
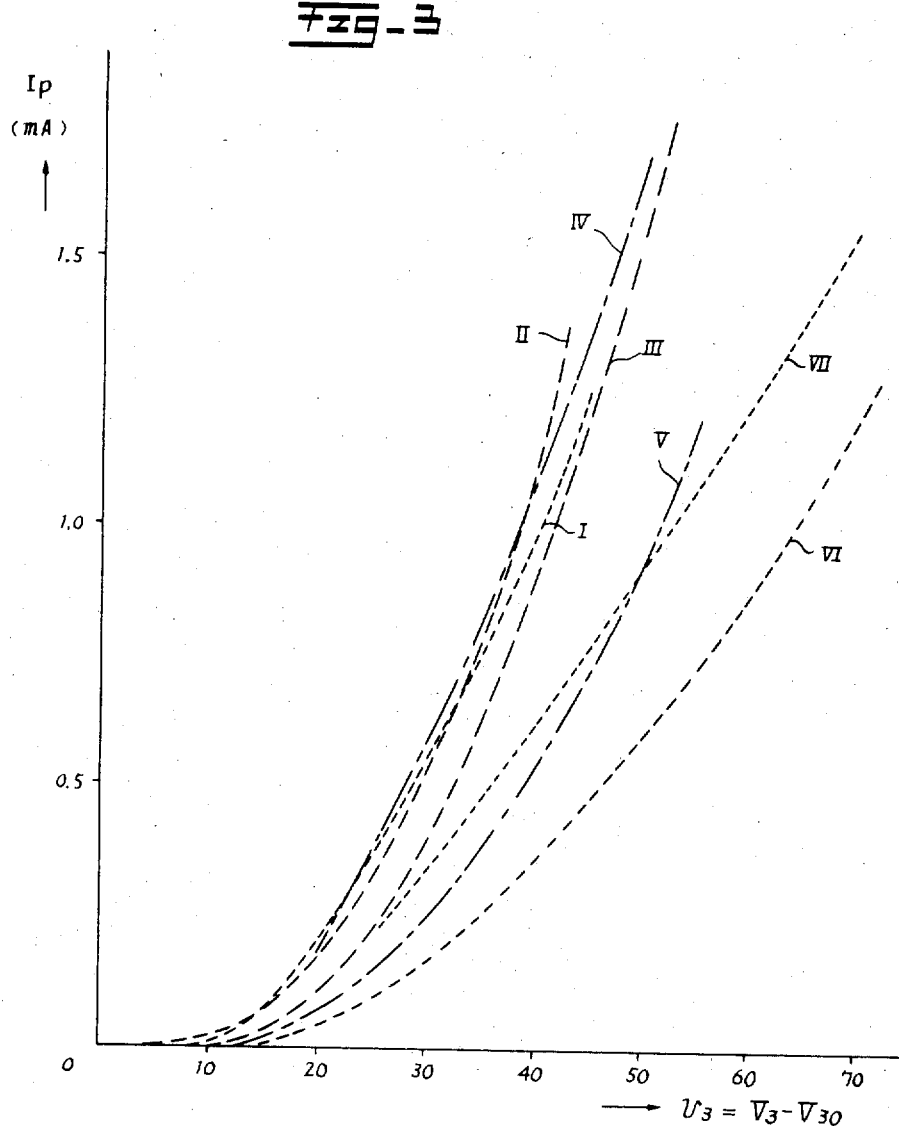
FIG. 3 is a graph showing control characteristic curves obtained with various particular representative structures of electron guns constructed according to the principles of this invention.
Figure 4:
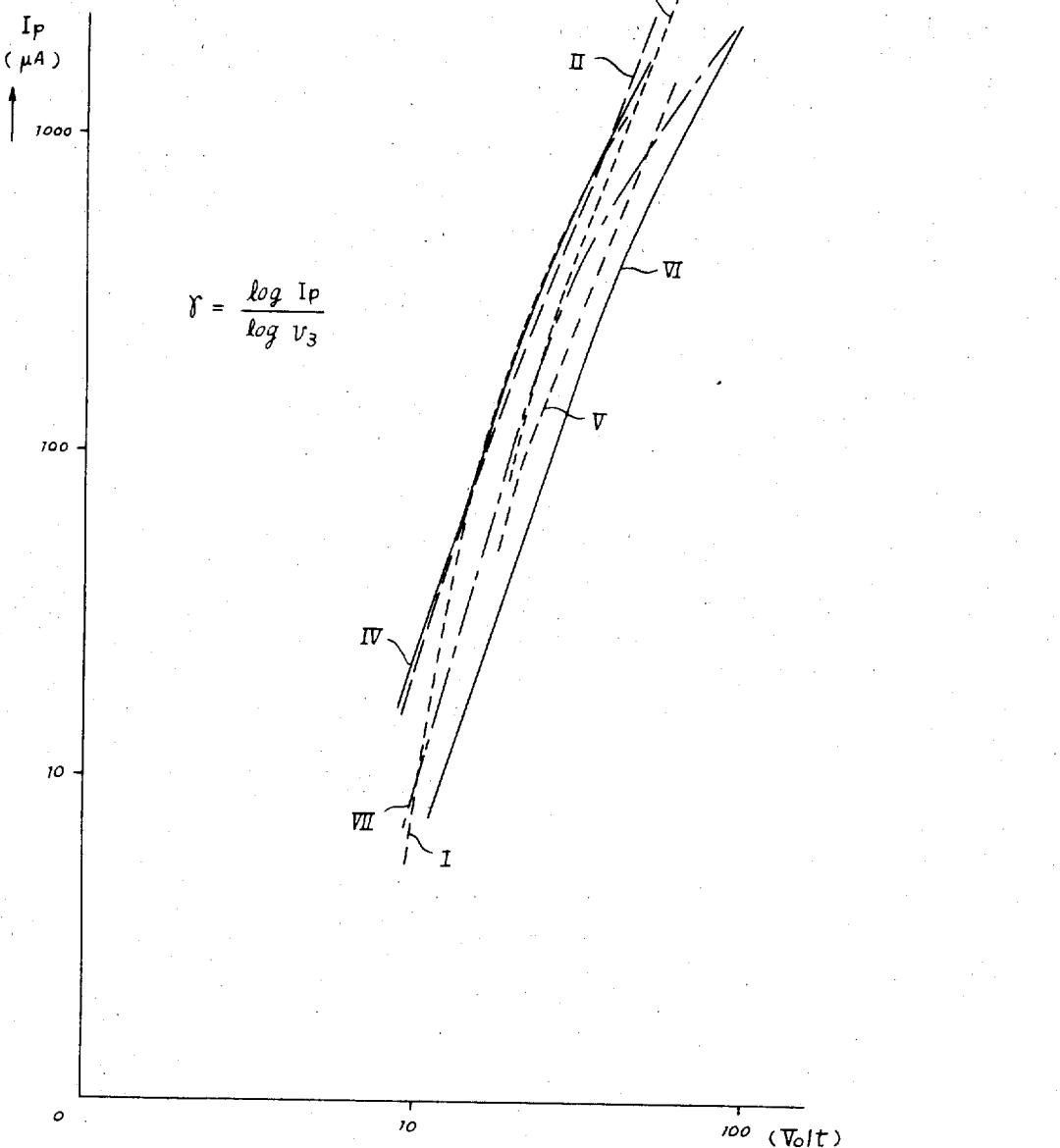
FIG. 4 is a graph showing gamma characteristic curves of the particular electron guns of FIG. 3.

FIG. 3 illustrates control characteristic curves of the electrode $G_3$ of the electron guns specified in Table I, namely $V_3$ vs. $I_P$ characteristics thereof. FIG. 4 shows their gamma characteristic curves.

Figure 5:
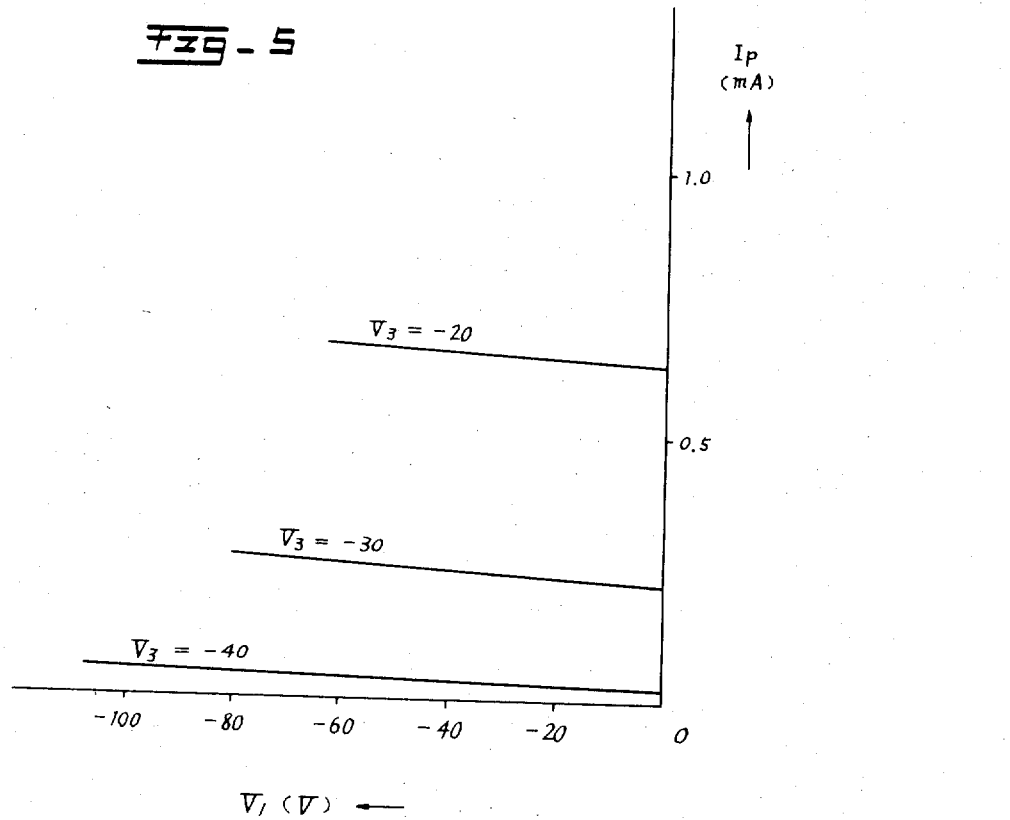
FIG. 5 is a graph illustrating the relationship between the output current and the control voltage with various cathode heater voltages of one represenative electron gun.

The electron gun of the present invention is characterized in that if $V_3$ is held constant, $V_1$ which raises the electron beam current $I_P$ up to a maximum value varies with the heater voltage of the cathode K and in that since the maximum value of $I_P$ is substantially constant, the variations in the heater voltage of the cathode K can be compensated for by adjusting $V_1$, if $V_3$ is held constant. This relationship is shown in FIG. 5, which illustrates the characteristics of $V_1$ and $I_P$ obtained with $V_3$ as the parameter in the case where the heater voltage was varied, having $V_2$ and $V_4$ held at the same potential.

Figure 6:
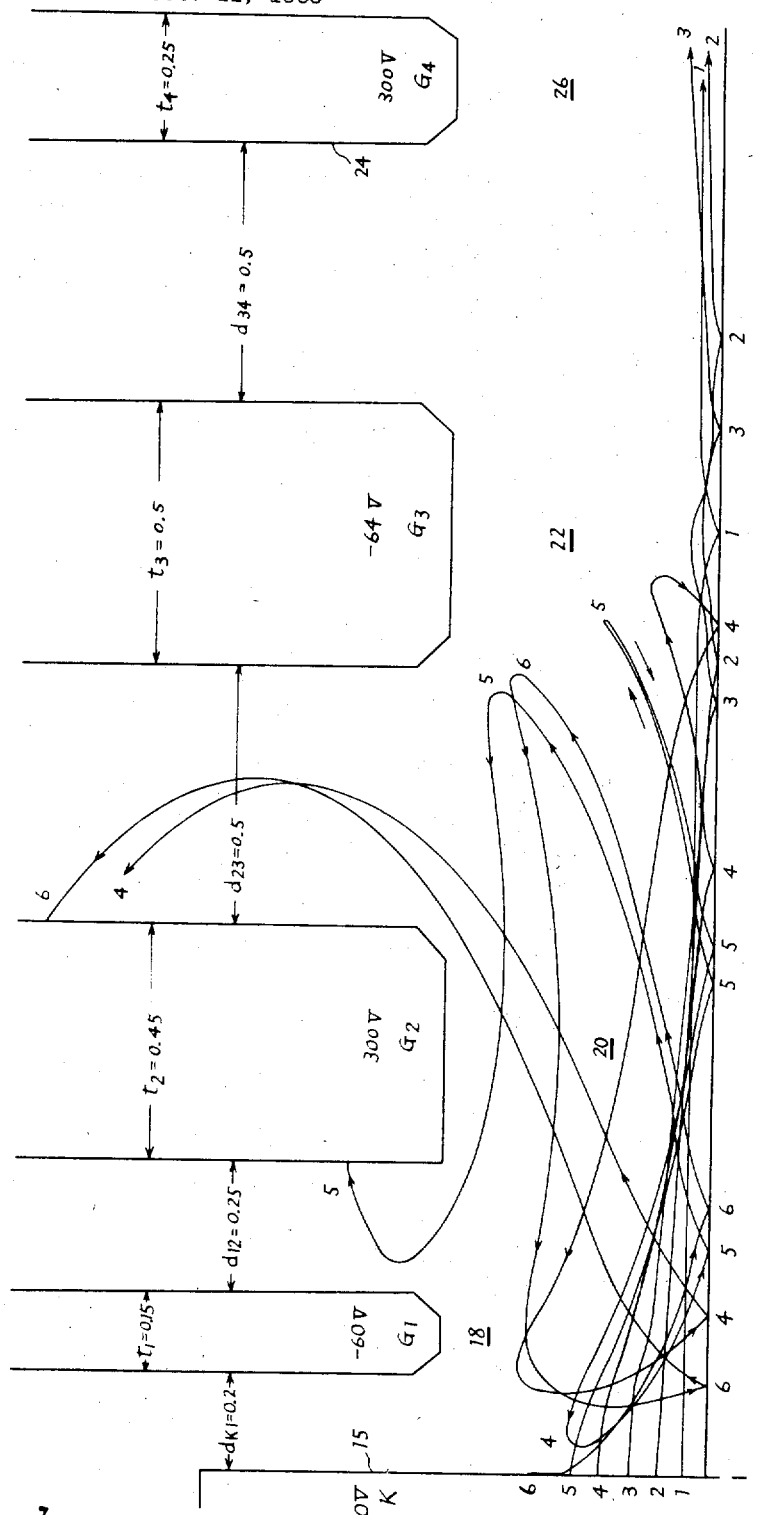
FIG. 6 is a diagrammatic representation of part of the structure and representative electron paths during particular biasing condition of a representative electron gun of the type depicted in FIG. 1 which representation is used for explaining the current control characteristics of the electron gun.

FIG. 6 illustrates the current control in one embodiment of the electron gun constructed according to the dimensions given in the figure, showing the paths taken by the electron beam obtained when the third electrode $G_3$ was biased approximately to a cut-off voltage ($-66$ v.).

It will be seen from this figure that an electron mirror is formed between the second and third electrodes $G_2$ and $G_3$ and the electron beams are thereby reflected into the electrode $G_2$ and only one part of the electrons passes through the aperture of the electrode $G_3$. That is, reflex control takes place by the electrode $G_3$.

As is apparent from the foregoing, the characteristic of the electron gun of this invention is determined by the third electrode $G_3$, so that its shape and dimension have a great influence upon the amplification constant $\mu$. Further, the aperture diameter D is subject to restriction by the focusing conditions. From Table I and FIGURE 3, it will be evident that the amplification constant $\mu$ increases with a decrease in the aperture diameter D, while $\mu$ decreases with an increase in D, increasing the perveance. In the electron guns having a small amplification constant $\mu$ such as specified in the rows Nos. VI and VII of Table I, the perveance is low in spite of the great aperture diameter. The amplification constant $\mu$ follows the equation set out below.

$$\mu \propto \frac{d_{23} \cdot d_{34} \cdot t_3}{D^3} \tag{1}$$

That is, the amplification constant of the electron of the electron gun is approximately equal to the product of the distance between the second and third electrodes, the distance between the third and fourth electrodes and the thickness of the third electrode divided by the cube of the aperture diameter.

Being subject to restriction by the focusing conditions, the aperture diameter D cannot be made greater than 1.2 mm. in practice but the amplification constant $\mu$ can be freely lowered by decreasing $d_{23}.d_{34}.t_3$.

However, the relationship given by the Equation 1 cannot be applied where the amplification constant $\mu$ is less than 2 to 3. Where the aperture diameter D is constant and $t_3=t_4$, the amplification constant $\mu$ is alway greater than 1, even if $d_{23}$ and $d_{24}$ are made substantially equal to zero. However, if $t_3<t_4$, the amplification constant $\mu$ can be made less than 1. For example, with a structure such that $d_{23}=d_{34}=0.15$ mm., $t_3=0.03$ mm., $t_4=0.25$ mm. and $D=0.7$ mm., the amplification constant $\mu$ was 0.85.

The perveance has a tendency to vary with the amplification constant $\mu$ but its variations with the aperture diameter D are not always the same as those with the amplification constant $\mu$. Since the current to be controlled increases with an increase in the aperture diameter D, the perveance shows a tendency to increase. However, the aperture diameter D cannot be made large because aberration would occur rather than an increase of spot size. In the case where $d_{23}$, $d_{34}$ and $t_3$ are made small so as to decrease the amplification constant $\mu$, the inter-electrode capacity and the mechanical strength of the electrodes must be considered. That is, when an aperture is made in the electrode plate or the electrode is made radial so as to decrease capacity thereof, attention must be paid to its mechanical strength.

In order to obtain the amplification constant $\mu$, a minimum potential on the center line of the aperture of the electrode $G_3$ is measured when a unit potential is applied to the electrodes $G_2$ and $G_4$ and the potential of the electrode $G_3$ is made equal to the earth potential. If this minimum potential is referred to as P, the amplification constant $\mu$ is given by the following equation:

$$\mu = \frac{1-P}{P} \tag{1'}$$

Figure 7:
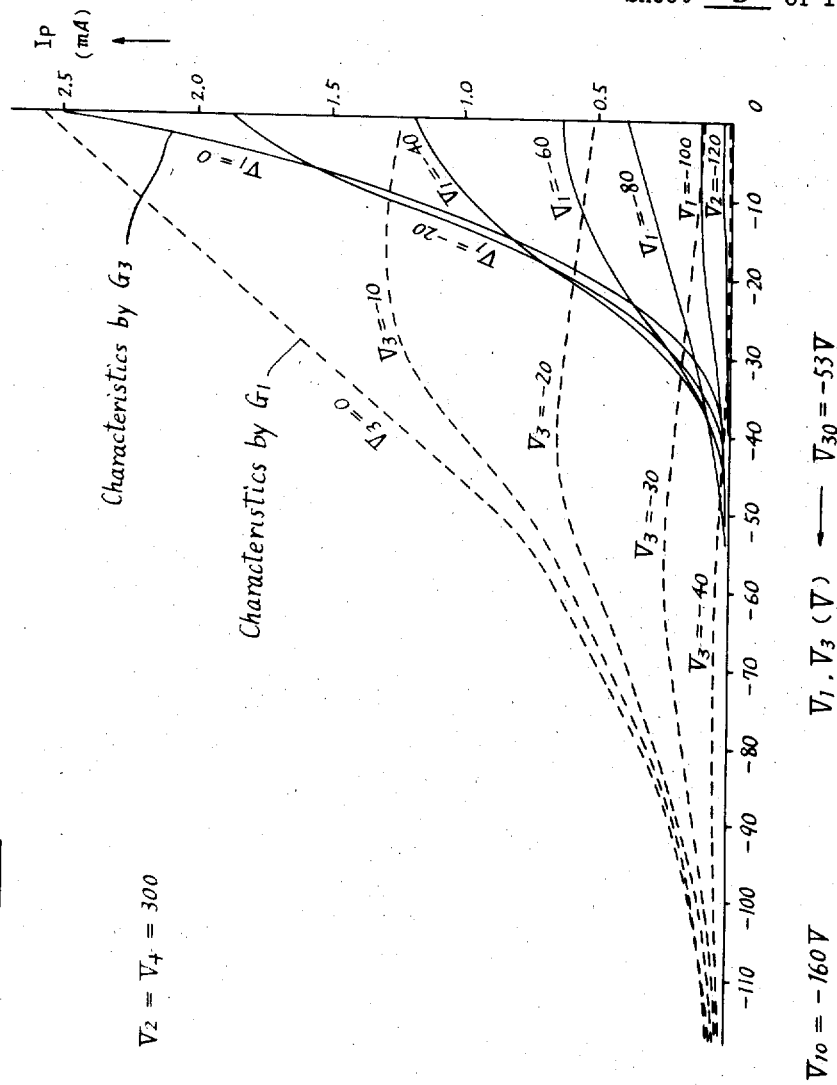
FIG. 7 illustrates control characteristic curves by first and third grid electrodes of representative electron gun constructed according to the invention.

FIGURE 7 illustrates the control characteristics by the electrodes $G_1$ and $G_3$ of the electron gun specified in the row II of Table I. In this figure, the broken line curves show the beam current characteristics by the electrode $G_1$ when the voltage $V_3$ of the electrode $G_3$ is fixed and the solid line curves those by the electrode $G_3$ obtained when the voltage $V_1$ of the electrode $G_1$ is fixed under such conditions that $V_2=V_4=300$ v. and $V_k=0$. From these curves it is apparent that all beam currents are obtained in the form of the product of $V_1$ and $V_3$. In the control characteristics by the electrode $G_1$, there is a negative portion of its transconductance $g_m$. It is caused by a decrease in the current passing through the aperture of the electrode $G_3$ the potential of which decreases with an increase in the space charge when $V_1$ is made to approach zero potential. In FIG. 7, there is not shown an output current with respect to the positive value of $V_1$, but by biasing $G_1$ positively to increase the emission of the electron beam, the electron beam current $I_P$ is decreased further and finally to zero by the aforementioned reason. Accordingly, the $I_P$-$V_1$ curve becomes symmetrical with respect to the ordinate with the maximum value of $I_P$. The characteristics depicted in FIG. 3 are measured values of the maximum value of $I_P$ with respect to $V_3$.

If different signals are applied to the electrodes $G_1$ and $G_3$ serving as input terminals, the electron beam current $I_P$ is given in the form of the product of the signals and if a signal is applied to the cathode K, $I_P$ is approximately expressed by the following equation:

$$I_P = k(v_k + v_1)^{r_1} \cdot (v_k + v_3)^{r_2} \quad (2)$$

where $r_1$ and $r_2$ are constants.

In using the above described electron gun in a color television kinescope used in conjunction with a self-decoding system, a gating signal is applied in the form of the product in the self-decoding system, the characteristic given by the Equation 2 can be made use of in the following equation:

$$I_P = k\{Y + (C)^{r_1}\} \cdot g^{r_2} \quad (3)$$

where Y is a luminance signal, C is the chrominance signal having only color or color difference information and $g$ is the gating signal.

In this case, the Y signal, the gating signal and the C signal are applied respectively to the cathode K, the electrode $G_1$ and the electrode $G_3$, and a fixed bias is applied to the electrodes $G_2$ and $G_4$ connected together. Since the Y signal and the C signal are substantially the same in magnitude, approximately equal drive signals are applied to the cathode K and the electrode $G_3$, but the cutoff bias of the electrode $G_3$ is about $-60$ volts, so that in this case the drive signals of about 60 volts are applied to each of the cathode K and the electrode $G_3$. The electron beam current in this case is given from the Equation 2 by the following one:

$$I_P = k\{Y + C\}^{r_2} \cdot (Y + g)^{r_1} \quad (4)$$

The Y signal appearing in the term of the gating signal is applied to the electrode $G_1$. The gating signal is about 150 volts and about three times as large as the drive signals of the cathode K and the electrode $G_3$, and hence the rate of an influence of the Y signal upon the gating is 25% or so and the gating can be sufficiently carried out. On the other hand, where the Y signal, the C signal, and the gating signal are fed, respectively, to the cathode K, the electrode $G_1$ and the electrode $G_3$, the Y signal has too great an influence upon the gating, so that a favorable gating cannot take place.

Figure 8:
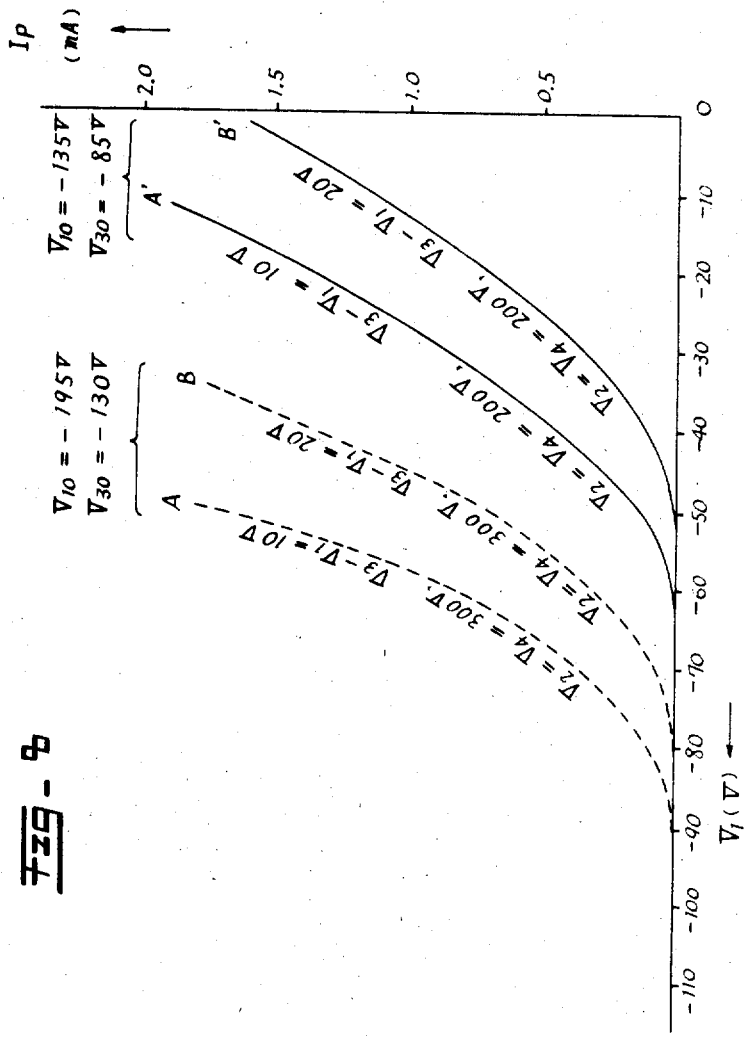
FIG. 8 is an illustration of control characteristic curves obtained when the first and third grid electrodes of a representative electron gun are connected together with respect to alternating current.

In the case where the electron gun of this invention is adapted for use in the re-encoding system or in a monochrome picture tube, it is convenient to use either the cathode K or the electrode $G_3$ as an input terminal. When the electrodes $G_1$ and $G_3$ are connected with respect to alternating current and driven by the same signal, the characteristics shown in FIG. 8 are obtained in the electron gun such as specified in the row, No. IV of Table I. In this case, the electrodes $G_2$ and $G_4$ are connected together as in the foregoing example but the bias is applied in the form of the sum thereof. This will be seen from the fact that the curves A and B assume the positions of the curves A' and B' by a variation of 100 volts in $V_2(=V_4)$ in FIG. 8.

These curves A' and B' are those in which the curves A and B have shifted in parallel to each other and they can be approximately expressed by the following equation:

$$I_P = k(V_3 - V_{30})^r \quad (5)$$

where $r$ is a constant.

According to the following definition of the amplification constant $\mu$, $$\mu = \frac{V_2 - V_k}{V_k - V_{30}} \quad (6)$$

by substituting $$-V_{30} = \frac{1}{\mu} V_2 - \left(1 + \frac{1}{\mu}\right) V_k$$

into the Equation 5, it follows that $$I_P = k\left\{V_3 + \frac{1}{\mu} V_2 - \left(1 + \frac{1}{\mu}\right) V_k\right\}^r \quad (7)$$

The above Equation 7 is obtained in the case of driving a terminal formed by connecting the electrodes $G_1$ and $G_3$ with respect to alternating current and that formed by connecting the electrodes $G_2$ and $G_4$, and hence this equation shows that if the cathode K is driven as a terminal, the electron beam current $I_P$ can be obtained in the form of the sum of the three signals. That is, the Equation 7 can be expressed by the working voltage as follows:

$$I_P = k\left\{v_3 + \frac{1}{\mu} v_2 - \left(1 + \frac{1}{\mu}\right) v_k\right\}^r \quad (8)$$

It is most desirable in electron guns for chromatron tubes that the output current is obtained in the form of primary coupling of signals.

Figure 9:
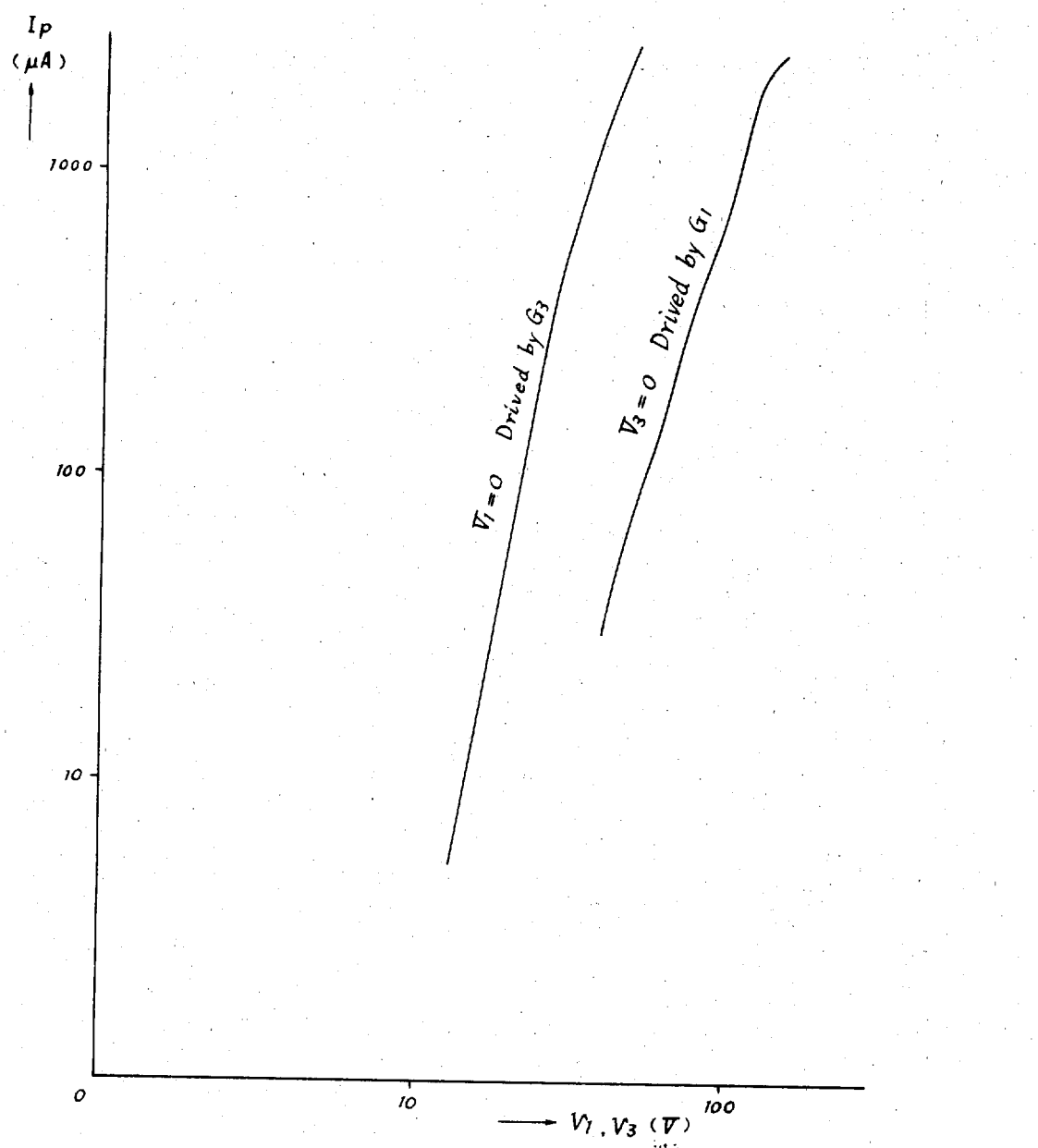
FIG. 9 shows gamma characteristic curves of the first and third grids.
Figure 10:
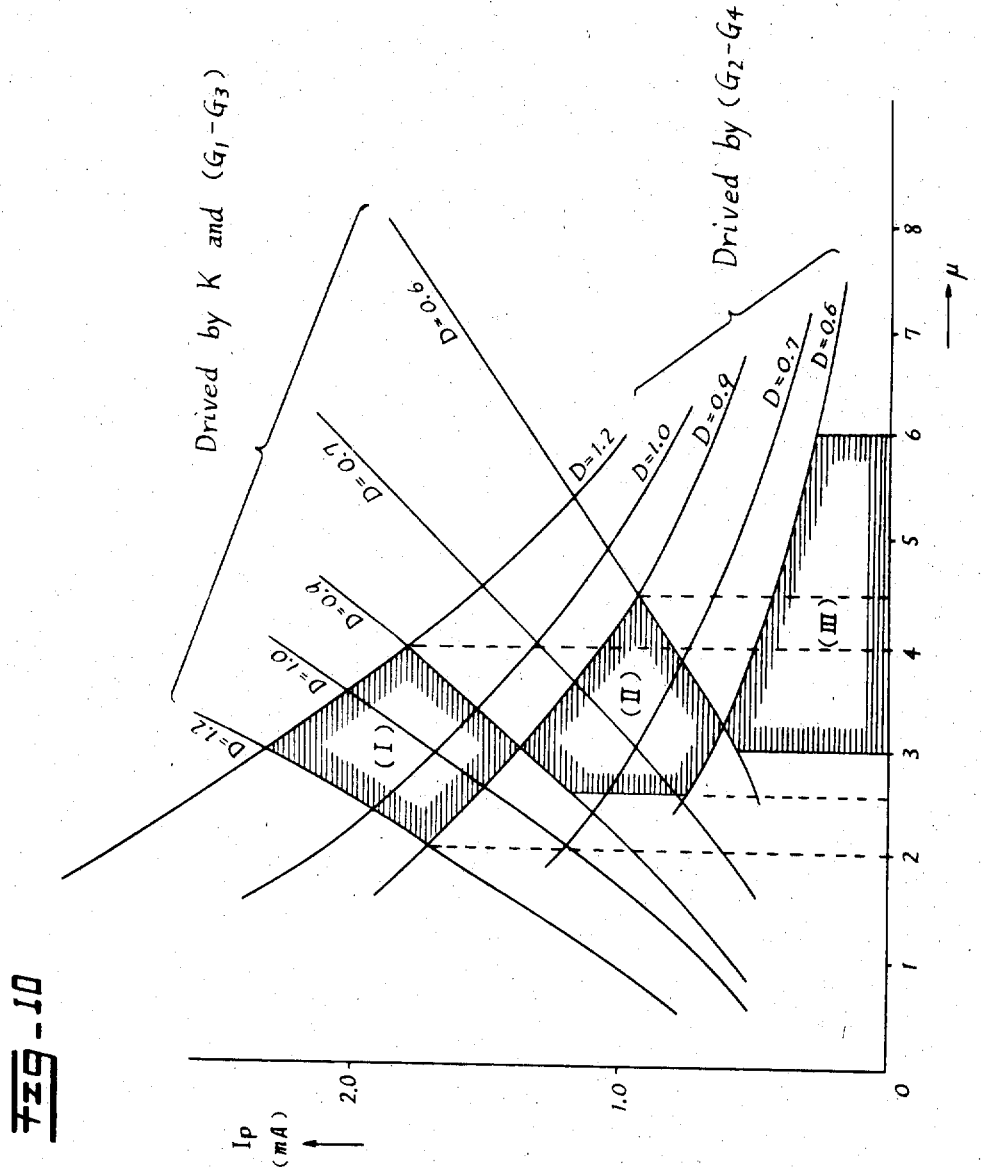
FIG. 10 illustrates control characteristic curves obtained with an electrode structure such that the cathode is used as a first terminal, the first and third grids connected with respect to alternating current is as a second terminal and the second and fourth grids connected together is as a third terminal.

FIG. 9 illustrates the gamma characteristics of the electrodes $G_1$ and $G_3$. Since the gamma characteristics in the case where the electrodes $G_1$ and $G_3$ are connected with respect to alternating current vary with the value of $$(V_3 - V_1)$$

the gamma characteristics can be controlled by adjusting the bias of the electrode $G_1$. In addition, the peak beam current is determined by $V_3$ and not so much affected by $V_1$, so that when the cathode has deteriorated, the emission of the electron beam can be adjusted by decreasing the bias of the electrode $G_1$. Therefore, the life of the cathode can be lengthened by connecting the electrodes $G_1$ and $G_3$ with respect to alternating current.

Where the electron gun is driven through the cathode K as a first terminal and the electrodes $G_1$ and $G_3$ connected together with respect to alternating current as a second terminal and the electrodes $G_2$ and $G_4$ connected together as a third terminal, the control characteristics of terminals with respect to the amplification constant $\mu$ are shown in FIG. 10 from the Equation 8. FIG. 10 illustrates the case where drive signals of 50 volts were applied to the first and second terminals and a drive signal of 150 volts was applied to the third terminal, and this graph shows that the beam current capacity of the electron gun is determined by the amplification constant $\mu$ and the aperture diameter D in such a case.

In the electron gun of the present invention $D \leq 1.2$ mm. from a viewpoint of aberration and the amplification constant $\mu$ and the perveance $k$ of the electron gun with respect to a necessary beam current must be taken into account. The perveance $k$ increases and the amplification constant $\mu$ decreases with an increase in the aperture diameter D. Furthermore, the perveance $k$ and the amplification constant $\mu$ increase as $d_{23} \cdot d_{34} \cdot t_4$ increases. Accordingly, when the necessary beam current is great, the aperture diameter D must be large, and when the third terminal is driven the amplification constant $\mu$ is required to be small. In the case where the third terminal is not used, it is preferred that the amplification constant $\mu$ is great. In view of the foregoing, favorable conditions for the respective cases are given in the following in which the necessary beam current is $I_p$max.

(I) In the case of $I_p$max$>1$ ma., $$0.9 \text{ mm.} \leq D \leq 1.2 \text{mm.}$$

$$2 \leq \mu \leq 4$$

(II) In the case of $0.5$ ma.$< I_p$max$\leq 1$ ma., $$0.6 \leq D \leq 0.9$$

$$2.5 \leq \mu \leq 4.5$$

(III) In the case of $< I_p$max$\leq 0.5$ ma., $$D \leq 0.6$$

$$3 \leq \mu \leq 6$$

In these three cases the third terminal is driven but when it is not driven the upper limit of the amplification constant $\mu$ is not necessary.

When the output current is obtained in the form of the product such as given by the Equation 2 in the electron gun of this invention, the amplification constant $\mu$ does not appear in the equation of $I_p$, but the amplification constant $\mu$ is preferred to be great as in the case where the third terminal is not driven.

Where a current is required to be greater than 1 ma., $1.2$ mm.$\leq D \leq 0.6$ mm. and the amplification constant $\mu$ is desired to be great but preferably 5 to 7 so as to obtain a drive signal of some extent for obtaining a favorable focusing.

The electron gun according to this invention is of high transconductance with respect to all the input terminals. In the electron gun specified in the row of, for example, No. IV of Table I and having such characteristics as shown in FIGURE 8, the transconductances of its input terminals are as follows:

First input terminal: 2 ma./50 v.
Second input terminal: 1.5 ma./50 v.
Third input terminal: 2 ma./150 v.

Such high transconductances imply that a great output can be obtained with a small driving voltage, and the power consumption of the eelctron gun is reduced to ⅓ of that of conventional electron guns.

The manner in which the electron gun of this invention is used in the chromatron tubes is given in the following.

(I) *Self-decoding system*

Figure 11:
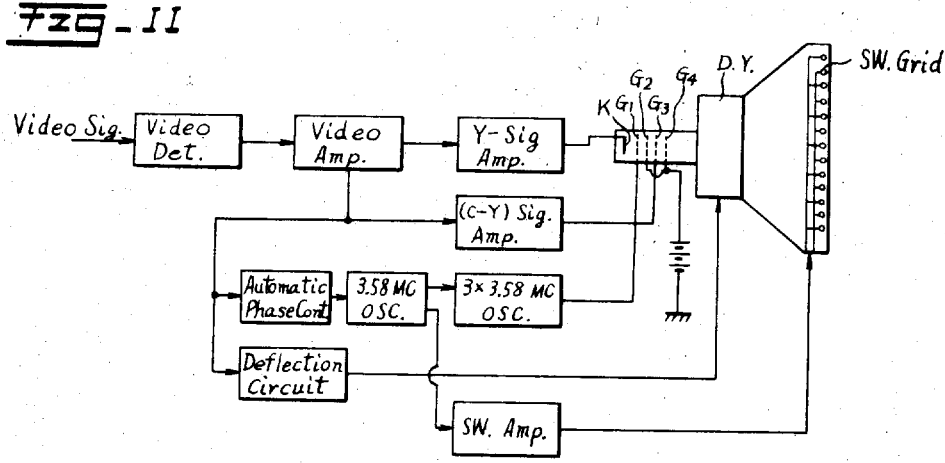
FIG. 11 is a block diagram illustrating a self-decoding example of television receiving apparatus to which a cathode ray tube having the electron gun of this invention is applied.

(1) In the case of applying gating signals in the form of the product thereof, the Y signal, gating signal and C signal are applied, respectively, to the cathode K, the electrode $G_1$ and the electrode $G_3$ and the electrodes $G_2$ and $G_4$ are fixed at the same potential as shown in FIGURE 11.

(2) In the case of applying gating signals in the form of the sum thereof, the Y signal is applied to the cathode K, the C signal is applied to the electrode $G_1$ connected with the electrode $G_3$ by means of a by-pass capacitor and the gating signal is fed to the electrodes $G_2$ and $G_4$ connected together.

(II) *Re-encoding system*

(1) In the case of applying only the C signal (in which signals of the NTSC system are demodulated to be dot-sequential signals), the cathode K and the electrode $G_3$ or the electrodes $G_1$ and $G_3$ are connected together by a by-pass capacitor and the C signal is fed to one of the terminals and the electrodes $G_2$ and $G_4$ are fixed at the same potential.

(2) In the case of applying gating signals to the C signal in the form of the sum, the signals are fed, respectively, to the cathode K and the electrodes $G_1$ and $G_3$ connected together by a by-pass capacitor and the electrodes $G_2$ and $G_4$ are fixed at the same potential.

(III) *New re-encoding system*

Figure 12:
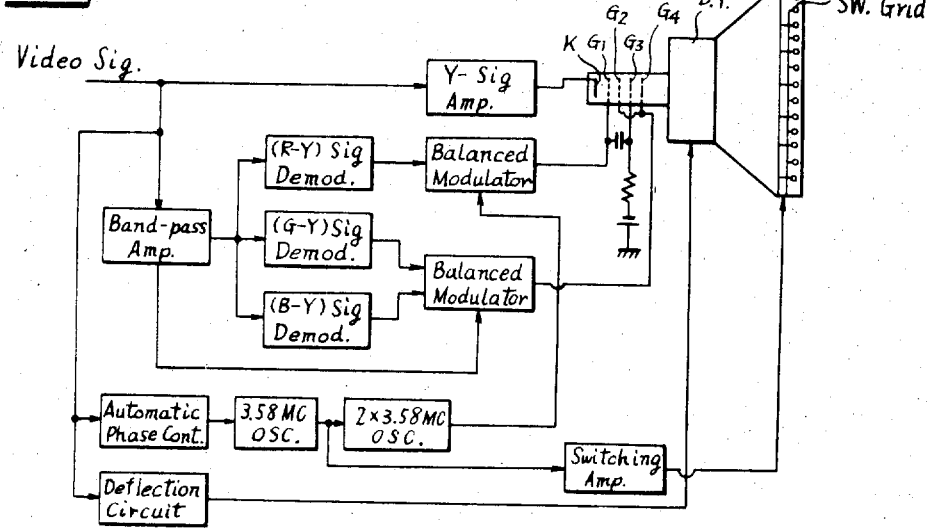
FIG. 12 is a similar block diagram of a new reencoding television apparatus to which a cathode ray tube to which the electron gun according to this invention is applied.

As illustrated in FIGURE 12, the Y signal, $(R-Y)$ signal and $(B-Y)$ signal are applied, respectively, to the cathode K, the electrodes $G_1$ and $G_3$ connected together by a by-pass capacitor and the electrodes $G_2$ and $G_4$ connected to each other.

Other various modifications are made but the above-described methods are basic.

As is now apparent, a new and improved electron gun device has been described which can create improvised picture display with lower power drive signals and is of special utility when employed in a color television receiver kinescope.

It will be understood that modifications and variations may be effected without departing from the scope of the novel concepts of the present invention.

What is claimed is:

1. A color television kinescope electron gun for producing a stream of electrons along a path coincident with the central axis of the electron gun comprising
    a cathode having a generally cylindrical shape positioned on said axis for producing electrons for said electron stream;
    a first grid having a generally cylindrical shape affixed about said axis adjacent to said cathode;
    said first grid having a greater cylindrical diameter than said cathode and having an apertured disc-shaped end affixed transverse to said axis with the aperture at said axis;
    an apertured disc-shaped second grid affixed normal to said axis adjacent to and downstream from said first grid, the aperture of said second grid being formed at said axis;
    an apertured disc-shaped third grid affixed normal to said axis affixed adjacent to and downstream from said second grid, the aperture of said third grid being formed at said axis and
    a fourth grid of a generally hollow cylindrical shape having one apertured disc-shaped end adjacent to and downstream from said third grid;
    said gun being constructed whereby the electron beam emitted from said gun may be selectively either the sum or the product of signal impresses upon selected grids of said gun,
    wherein the distance between said cathode and the disc-shaped end of said first grid is approximately equal to 0.1 millimeter and the thickness of said end is approximately equal to 0.18 millimeter;
    the distance between said first grid and said second grid is approximately equal to 0.2 millimeter and the thickness of said second grid is approximately equal to 0.4 millimeter;
    the distance between said second grid and said third grid is approximately equal to 0.5 millimeter and the thickness of said third grid is approximately equal to 0.4 millimeter;
    the distance between said third grid and the disc-shaped end of said fourth grid is approximately equal to 0.2 millimeter and the thickness of said fourth grid is approximately equal to 0.18 millimeter; and
    the apertures of said grids at said axis is approximately equal to 0.6 millimeter.

2. A color television kinescope electron gun for producing a stream of electrons along a path coincident with the central axis of the electron gun comprising
    a cathode having a generally cylindrical shape positioned on said axis for producing electrons for said electron stream;
    a first grid having a generally cylindrical shape affixed about said axis adjacent to said cathode;
    said first grid having a greater cylindrical diameter than said cathode and having an apertured disc-shaped end affixed transverse to said axis with the aperture at said axis;

an apertured disc-shaped second grid affixed normal to said axis adjacent to and downstream from said first grid, the aperture of said second grid being formed at said axis;

an apertured disc-shaped third grid affixed normal to said axis affixed adjacent to and downstream from said second grid, the aperture of said third grid being formed at said axis and a fourth grid of a generally hollow cylindrical shape having one apertured disc-shaped end adjacent to and downstream from said third grid;

said gun being constructed whereby the electron beam emitted from said gun may be selectively either the sum or the product of signal impresses upon selected grids of said gun, wherein the distance between said cathode and the disc-shaped end of said first grid is approximately equal to 0.12 millimeter and the thickness of said end is approximately equal to 0.15 millimeter;

the distance between said first grid and said second grid is approximately equal to 0.2 millimeter and the thickness of said second grid is approximately equal to 0.4 millimeter;

the distance between said second grid and said third grid is approximately equal to 0.4 millimeter and the thickness of said third grid is approximately equal to 0.4 millimeter;

the distance between said third grid and the disc-shaped end of said fourth grid is approximately equal to 0.4 millimeter and the thickness of said fourth grid is approximately equal to 0.25 millimeter; and the apertures of said grids at said axis is approximately equal to 0.7 millimeter.

3. A color television kinescope electron gun for producing a stream of electrons along a path coincident with the central axis of the electron gun comprising a cathode having a generally cylindrical shape positioned on said axis for producing electrons for said electron stream;

a first grid having a generally cylindrical shape affixed about said axis adjacent to said cathode;

said first grid having a greater cylindrical diameter than said cathode and having an apertured disc-shaped end affixed transverse to said axis with the aperture at said axis;

an apertured disc-shaped second grid affixed normal to said axis adjacent to and downstream from said first grid, the aperture of said second grid being formed at said axis;

an apertured disc-shaped third grid affixed normal to said axis affixed adjacent to and downstream from said second grid, the aperture of said third grid being formed at said axis and a fourth grid of a generally hollow cylindrical shape having one apertured disc-shaped end adjacent to and downstream from said third grid;

said gun being constructed whereby the electron beam emitted from said gun may be selectively either the sum or the product of signal impresses upon selected grids of said gun, wherein the distance between said cathode and the disc-shaped end of said first grid is approximately equal to 0.2 millimeter and the thickness of said end is approximately equal to 0.15 millimeter;

the distance between said first grid and said second grid is approximately equal to 0.3 millimeter and the thickness of said second grid is approximately equal to 0.4 millimeter;

the distance between said second grid and said third grid is approximately equal to 0.4 millimeter and the thickness of said third grid is approximately equal to 0.4 millimeter;

the distance between said third grid and the disc-shaped end of said four grid is approximately equal to 0.4 millimeter and the thickness of said fourth grid is approximately equal to 0.25 millimeter; and the apertures of said grids at said axis is approximately equal to 1.0 millimeter.

4. A color television kinescope electron gun for producing a stream of electrons along a path coincident with the central axis of the electron gun comprising a cathode having a generally cylindrical shape positioned on said axis for producing electrons for said electron stream;

a first grid having a generally cylindrical shape affixed about said axis adjacent to said cathode;

said first grid having a greater cylindrical diameter than said cathode and having an apertured disc-shaped end affixed transverse to said axis with the aperture at said axis;

an apertured disc-shaped second grid affixed normal to said axis adjacent to and downstream from said first grid, the aperture of said second grid being formed at said axis;

an apertured disc-shaped third grid affixed normal to said axis affixed adjacent to and downstream from said second grid, the aperture of said third grid being formed at said axis; and a fourth grid of a generally hollow cylindrical shape having one apertured disc-shaped end adjacent to and downstream from said third grid;

said gun being constructed whereby the electron beam emitted from said gun may be selectively either the sum or the product of signal impresses upon selected grids of said gun, wherein the distance between said cathode and the disc-shaped end of said first grid is approximately equal to 0.12 millimeter and the thickness of said end is approximately equal to 0.15 millimeter;

the distance between said first grid and said second grid is approximately equal to 0.2 millimeter and the thickness of said second grid is approximately equal to 0.4 millimeter;

the distance between said second grid and said third grid is approximately equal to 0.4 millimeter and the thickness of said third grid is approximately equal to 0.2 millimeter;

the distance between said third grid and the disc-shaped end of said fourth grid is approximately equal to 0.4 millimeter and the thickness of said fourth grid is approximately equal to 0.25 millimeter; and the apertures of said grids at said axis is approximately equal to 0.7 millimeter.

5. A color television kinescope electron gun for producing a stream of electrons along a path coincident with the central axis of the electron gun comprising a cathode having a generally cylindrical shape positioned on said axis for producing electrons for said electron stream; a first grid having a generally cylindrical shape affixed about said axis adjacent to said cathode;

said first grid having a greater cylindrical diameter than said cathode and having an apertured disc-shaped end affixed transverse to said axis with the aperture at said axis;

an apertured disc-shaped second grid affixed normal to said axis adjacent to and downstream from said first grid, the aperture of said second grid being formed at said axis;

an apertured disc-shaped third grid affixed normal to said axis affixed adjacent to and downstream from said second grid, the aperture of said third grid being formed at said axis and a fourth grid of a generally hollow cylindrical shape having one apertured disc-shaped end adjacent to and downstream from said third grid;

said gun being constructed whereby the electron beam emitted from said gun may be selectively either the sum or the product of signal impresses upon selected grids of said gun, wherein the distance between said cathode and the disc-shaped end of said first grid is approximately equal to 0.2 millimeter and the thickness of said end is approximately equal to 0.15 millimeter;

the distance between said first grid and said second grid is approximately equal to 0.3 millimeter and the thickness of said second grid is approximately equal to 0.4 millimeter;

the distance between said second grid and said third grid is approximately equal to 0.4 millimeter and the thickness of said third grid is approximately equal to 0.2 millimeter;

the distance between said third grid and the disc-shaped end of said fourth grid is approximately equal to 0.4 millimeter and the thickness of said fourth grid is approximately equal to 0.25 millimeter; and the apertures of said grids at said axis is approximately equal to 1.0 millimeter.

6. A color television kinescope electron gun for producing a stream of electrons along a path coincident with the central axis of the electron gun comprising a cathode having a generally cylindrical shape positioned on said axis for producing electrons for said electron stream;

a first grid having a generally cylindrical shape affixed about said axis adjacent to said cathode;

said first grid having a greater cylindrical diameter than said cathode and having an apertured disc-shaped end affixed transverse to said axis with the aperture at said axis;

an apertured disc-shaped second grid affixed normal to said axis adjacent to and downstream from said first grid, the aperture of said second grid being formed at said axis;

an apertured disc-shaped third grid affixed normal to said axis affixed adjacent to and downstream from said second grid, the aperture of said third grid being formed at said axis and a fourth grid of a generally hollow cylindrical shape having one apertured disc-shaped end adjacent to and downstream from said third grid;

said gun being constructed whereby the electron beam emitted from said gun may be selectively either the sum or the product of signal impresses upon selected grids of said gun, wherein the distance between said cathode and the disc-shaped end of said first grid is approximately equal to 0.2 millimeter and the thickness of said end is approximately equal to 0.15 millimeter;

the distance between said first grid and said second grid is approximately equal to 0.2 millimeter and the thickness of said second grid is approximately equal to 0.4 millimeter;

the distance between said second grid and said third grid is approximately equal to 0.2 millimeter and the thickness of said third grid is approximately equal to 0.4 millimeter;

the distance between said third grid and the disc-shaped end of said fourth grid is approximately equal to 0.15 millimeter and the thickness of said fourth grid is approximately equal to 0.25 millimeter; and the apertures of said grids at said axis is approximately equal to 1.0 millimeter.

References Cited
UNITED STATES PATENTS

| | | | |
|---|---|---|---|
| 2,370,700 | 3/1945 | Wolff | 315—15 |
| 2,465,406 | 3/1949 | Taylor | 315—14 X |
| 2,852,716 | 9/1958 | Lafferty | 315—15 |
| 3,374,379 | 3/1968 | Maruyama et al. | 315—16 X |

RODNEY D. BENNETT, *Primary Examiner.*

MALCOLM F. HUBLER, *Assistant Examiner.*